(12) United States Patent
Ptacek

(10) Patent No.: US 8,721,745 B2
(45) Date of Patent: May 13, 2014

(54) FUEL AND METHOD OF OBTAINING THERMAL ENERGY FROM BIOMASS WITH LOW ASH-MELTING TEMPERATURE, IN PARTICULAR FROM STILLAGE FROM BIOETHANOL PROCESSING, AND APPARATUSES FOR THE IMPLEMENTATION THEREOF

(76) Inventor: Milan Ptacek, Hranice (CZ)

( * ) Notice: Subject to any disclaimer, the term of this patent is extended or adjusted under 35 U.S.C. 154(b) by 620 days.

(21) Appl. No.: 12/673,863

(22) PCT Filed: Aug. 14, 2008

(86) PCT No.: PCT/CZ2008/000091
§ 371 (c)(1),
(2), (4) Date: Jan. 4, 2011

(87) PCT Pub. No.: WO2009/024100
PCT Pub. Date: Feb. 26, 2009

(65) Prior Publication Data
US 2011/0100273 A1 May 5, 2011

(30) Foreign Application Priority Data

Aug. 17, 2007 (CZ) .................................... 2007-559
Aug. 17, 2007 (CZ) .................................... 2007-560
Jan. 14, 2008 (CZ) ..................................... 2008-15

(51) Int. Cl.
*C10L 5/00* (2006.01)
(52) U.S. Cl.
USPC .................... 44/500; 44/504; 44/605; 44/606
(58) Field of Classification Search
USPC ................................... 44/500, 504, 605, 608
See application file for complete search history.

(56) References Cited

U.S. PATENT DOCUMENTS

| 5,352,252 A | 10/1994 | Tolmie |
| 2007/0254089 A1 | 11/2007 | Hickey et al. |
| 2007/0266916 A1* | 11/2007 | Copeland et al. ............. 110/243 |

FOREIGN PATENT DOCUMENTS

| CZ | 300046 B6 | 1/2009 |
| EP | 1790732 A1 | 5/2007 |

(Continued)

OTHER PUBLICATIONS

International Search Report and Written Opinion from counterpart international Application No. PCT/CZ2008/00091 mailed Jun. 24, 2009 (24 pages).

(Continued)

*Primary Examiner* — Cephia D Toomer
(74) *Attorney, Agent, or Firm* — Wood, Herron & Evans, LLP

(57) ABSTRACT

The invention relates to fuel formed by a fuel mixture, whose one component is formed by partially dewatered stillage from the bioethanol production and the other one are milled materials, where the ratio of total of sodium weight and potassium weight in the ashes to the weight of the other non-combustible components of a value less than 1:5.85 and/or it set up to achieve the resulting ash melting temperature of the mixture higher than 760° C. It also relates to the method of obtaining thermal energy from this mixture, in which first the critical combustion temperature causing slagging in the furnace and/ or on the heat transfer surfaces and/or of the fluidized bed with melted ashes is ascertained and then the ratio of stillage from the production of bioethanol and to the biomass with low melting temperature of ashes to milled materials is set up in a ratio giving a higher ash-melting temperature of the resulting mixture than the ascertained critical temperature and then the obtained partially dewatered mixture is combusted in the combustion apparatus. It also relates to the method of obtaining thermal energy from waste in the preparation of the fuel mixture, e.g. from centrate, and to the apparatuses for the implementation thereof.

16 Claims, 6 Drawing Sheets

(56) References Cited

FOREIGN PATENT DOCUMENTS

WO      00/11115      3/2000
WO      2006/021087 A1      3/2006

OTHER PUBLICATIONS

European Written Opinion from European counterpart Application No. 08801028.5 dated Nov. 19, 2010 (8 pages).
Database WPI Week 200501, Thomson Scientific, London, GB; AN 2005-005123, XP002512648 and JP 2004 247271 A (Mitsubishi Jukogyo KK) Dec. 9, 2004, abstract (1 page).
Annamalai et al, "Co-firing of coal and cattle feedlot biomass (FB) Fuels, Part III: fouling results from a 500,000 BTU/h pilot plant scale boiler burner", Fuel 82, No. 10, (2003), pp. 1195-1200.
Steenari et al, "High-temperature reactions of straw ash and the anti-sintering additives kaolin and dolomite", Biomass and Bioenergy, vol. 14, No. 1, (1998), pp. 67-76.
Salour et al, "Control of in-bed agglomeration by fuel blending in a pilot scale straw and wood fueled AFBC", Biomass and Bioenergy, vol. 4, No. 2, (1993), pp. 117-113.
Liu et al, "On the combustion mechanism and development of the distillers' grain-fired boiler", Applied Thermal Engineering, vol. 22 (2002), pp. 349-353.
Pfeffer et al, "Analysis and decrease of the energy demand of bioethanol-production by process integration", Applied Thermal Engineering, vol. 27 (2007), pp. 2657-2664.
Olanders, Birgitta et al. "Characterization of Ashes from Wood and Straw", Biomass and Bioenergy, vol. 8, No. 2, Jan. 1, 1995, pp. 105-115 (XP55056008).
Wilen, Staahlberg, Sipila, Ahokas, "Pelletization and Combustion of Straw", Energy Biomass Wastes, vol. 10, 1987 pp. 469-484 (XP009167853).
Official Action received in counterpart European Patent Application No. 08 801 028.5, dated Apr. 19, 2013 (6 pages).

\* cited by examiner

FUEL AND METHOD OF OBTAINING THERMAL ENERGY FROM BIOMASS WITH LOW ASH-MELTING TEMPERATURE, IN PARTICULAR FROM STILLAGE FROM BIOETHANOL PROCESSING, AND APPARATUSES FOR THE IMPLEMENTATION THEREOF

FIELD OF THE INVENTION

The invention is related to the fuel composed of a mixture, whose one component is biomass with low ash-melting temperature, such as stillage from bioethanol processing, corn straw, cereals, remains from the production of sunflower-seed oil or rape-seed oil, extracted corn meal, corn flour, maize flour or maize meal, to the method of obtaining thermal energy from low ash-melting temperature biomass and to the apparatuses for the implementation thereof.

BACKGROUND OF THE INVENTION

In agricultural production, a number of residues is originated in the elaboration of agricultural products, which are occasionally further treated, e.g. wood chips to produce cellulose, corn straw as litter or corn stalks for silage. In case the supply of the above materials exceeds their demand, it is possible to use some of them, e.g. wood chips, for the generation of energy by their combustion, nevertheless, other materials, e.g. corn straw, cannot be simply burnt down and if grate boilers of special design are not used, e.g. boilers with water-cooled grates in which combustion gases are cooled down in the combustion chamber, it is necessary to apply the inefficient deposition.$_5$ Most materials considered as fuels have a high ash-melting temperature, usually of more than 1,300° C. Other materials containing carbon and thus potentially combustible materials, such as corn straw, pressed work from the production of methyl ester, or residues from the production of sunflower-seed oil, have a lower ash-melting temperature, which is usually in the range of 850-1,050° C. Specifically, the ash-melting temperature of corn straw is about 850° C., of corn and meals from corn 620 to 750° C. and even less, of residues from sunflower-seed production 1,010° C., pressed work from rape-seed methyl esters about 1,210° C. The low ash-melting temperature causes build-up of slag in the combustion chamber, in the boiler combustion space and even on the heat transfer surfaces and thus it challenges the operation of the boiler and sometimes even makes its operation impossible. In fluidized bed boilers, these materials are not burnt due to the low temperature of ash matter.

At present, due to the efforts to get rid of the dependence on in the import of fossil fuels, in particular crude oil, the interest in the use of hitherto unused organic matter, especially waste organic matter, for the production of energy, has been growing. The interest is especially focused on the production bio-ethanol, which could be produced in every country from its local agricultural crops and thus crude oil could be replaced for the greater part with it. For the production bioethanol, sugary and starch crops can be used, in particular sugar beet and cereals. Produced bioethanol can be used directly in the combustion engines as fuel, nevertheless, at present it is usually used as an admixture, which is added in the amounts of 5% to 10% to the conventional mineral fuels. Using ethanol, the octane number is increased and the amount of $CO_2$ emissions decreased.

The sugarcane ethanol has found its wide application especially in Brazil, where it is used as automotive fuel. In the 80-ies of the last century, approximately two-thirds of cars in Brazil had their engines specially adapted for the combustion of pure bioethanol. At present, the new cars are not adapted in this way any more, nevertheless, all motor-vehicle petrol in Brazil contains 26% of sugarcane bioethanol. Current combustion engines can run on this mixture.

The bioethanol produced from maize is also used as a fuel additive to most automotive petrols in the USA, usually as a 10% admixture.

The waste in the production of bioethanol from maize, cereals or sugarcane, sugar beet is stillage. The stillage could also be potentially used as fuel, nevertheless, due to its low ash-melting temperature, it is not used as fuel. At present, the stillage is usually centrifuged on a centrifuge, the solid fraction, called cake, is dried in a steam drier or a drum drier, where the drier heating medium is fossil fuel. The liquid fraction, called centrate, is condensed in multi-stage evaporators to obtain syrup, which is added to the solid fraction, the cake, and it is dried together with it in a steam drier or a drum drier. Thus a by-product is produced, which is used as a forage mixture in the form of dried granules. The unused part is also dumped into the sea in the countries having appropriate conditions for it.

The major part of stillage, especially due to the ever growing production of bio-ethanol, is thus not used any more, it goes beyond its use as forage, and thus it is indispensable to look for other possibilities of its application. Its direct combustion is thus impossible, as stillage without drying has low caloric power and it usually contains approx. 90% of water. If stillage is dried to 40-30-10% of moisture content, its caloric power would increase to approx. 9-13-17 MJ/kg. From the aspect of energy, such dried stillage is thermally self-supporting, which lays down one of the prerequisites for its combustion in current boilers. Nevertheless, it has been found that dried stilled can not be combusted in current boilers, at least nobody has been successful in it so far due to its low-temperature melting ashes. When combusting this sort of stillage, the low melting temperature of ashes both in grate boilers and the fluidized bed boilers and dry bottom boilers results in the fact that melted ash agglomerates the fluidized bed, it forms slag in the furnace and on the heat exchange surfaces of the boiler, resulting in a breakdown of the boiler, which is put out of service in a matter of a few minutes.

The experts have been hitherto of the opinion that the problem of exploiting biowaste with low ash-melting temperature could be solved by adapting the boiler. Nevertheless, up to now nobody has succeeded in it.

Another possible method of exploiting stillage is the system in which the liquid stillage as a whole is conveyed to the biogas station to produce biogas from it. The disadvantage of this method is the fact that biogas is produced only from the liquid fraction of the stillage and thus the solid fraction is practically wasted. Prolongation of the decomposition time would increase the biogas yield, nevertheless, it would be at the price of higher investment and operation costs. In addition to it, the solid residue after the utilization of stillage in the biogas station would be higher by 50%, even in case of a very long fermentation period. This system thus does not find any solution to the problem of the stillage solid fraction.

BRIEF DISCLOSURE OF THE INVENTION

The above problem of obtaining thermal energy from biomass with low melting temperature of ashes is solved to a great extent by the fuel composed of a mixture, whose one fraction consists of biomass with low melting temperature of ashes, as stillage from the production of bioethanol, corn straw, cereals, residues from the production of sunflower-seed oil or rape-seed oil, extracted meal, corn flour, maize flour or maize meal, where the subject matter of an invention consists in the fact that further component of the mixture is at least one milled material selected from the group including limestone, lime hydrate, lime, stone, sand, combustion ashes, products of desulphurization, dust residues from the production and treatment of ore, aggregates, fossil solid fuels as coal, lignite, peat, solid fuels produced from the water treatment sludge, artificial fuels produced from the group of petrol cokes, biomass fuels with high melting temperature of ashes, as wood chips, rape straw, hay, grasses, tree pruning residues, energy crops as sorrel, hop-tree, while the ratio of biomass with low melting temperature of ashes of milled materials is set up to achieve the ratio of total weight of sodium and potassium in the ashes to the weight of the remaining non-combustible components in the ashes of a valued less than 1:5.85 or it is set up to achieve the resulting ash melting temperature of the mixture higher than 760° C.

In a preferred embodiment of the invention, the ratio of biomass with low melting temperature of ashes to the milled materials in the fuel mixture is set up to achieve a ratio of sodium weight and potassium weight in the ashes to the weight of the other non-combustible components of a value less than 1:6.50 and/or it is set up to achieve the resulting melting temperature of ashes of more than 1,200° C. or even more preferably to a value less than 1:15 and/or it is set up to achieve the resulting ash melting temperature of the mixture higher than 1,300° C.

In another preferred embodiment, the fuel mixture is dewatered to the dry solid content of more than 20% by weight or even more preferably to the dry solid content of more than 86% by weight.

The specified problem of obtaining thermal energy from biomass with low melting temperature of ashes also gives to a considerable extent a solution to the method of producing thermal energy from biomass with low melting temperature of ashes as corn straw, cereals, residues from the production of sunflower-seed oil or rape-seed oil, extracted corn meal, corn flour, maize flour or maize meal, where the subject matter of the invention consists in the fact that the biomass with low melting temperature of ashes is complemented by milled materials selected from the group including limestone, lime hydrate, lime, stone, sand, combustion ashes, products of desulphurization, dust residues from the production and treatment of ore, aggregates, fossil solid fuels as coal, lignite, peat, solid fuels produced from the water treatment sludge, artificial fuels of ashes, as wood chips, rape straw, hay, grasses, tree pruning residues, energy crops as sorrel, hop-tree, the critical combustion temperature causing slagging in the furnace and/or on the heat transfer surfaces and/or of the fluidised bed and the ratio in which the biomass with low melting temperature of ashes is complemented with milled substances is determined to achieve a higher melting temperature of the ashes of the resulting mixture than the ascertained critical combustion temperature and then the obtained mixture is gradually combusted in the furnace of the combustion apparatus.

In a preferred embodiment of this method of obtaining thermal energy, the biomass with low melting temperature of ashes is mixed with milled materials prior to conveying it to the furnace of the combustion apparatus or directly in it.

In another preferred embodiment of this method, the biomass with low melting temperature of ashes or its mixture with milled materials is partially dewatered to obtain the dry solid content of at least 20% by weight in the mixture of the biomass with low melting temperature of ashes and milled materials, or even more preferably to the dry solid content of at least 86% by weight in the mixture of the biomass with low melting temperature of ashes and milled materials.

It is also advantageous, if the ratio of biomass with low melting temperature of ashes to the milled materials is set up to achieve a ratio of sodium weight and potassium weight in the ashes to the weight of the other non-combustible components of a value less than 1:5.85 and/or it is set up to achieve the resulting melting temperature of ashes of more than 760° C. or even more preferably to a value less than 1:6.50 and/or it is set up to achieve the resulting melting temperature of ashes of the mixture of more than 1,200° C. or even more preferably to a value less than 1:15 and/or it is set up to achieve the resulting ash melting temperature of the mixture higher than 1,300° C.

It is advantageous, if partial dewatering of biomass with low melting temperature of ashes or of its mixture with milled materials is carried out mechanically and/or thermally and/or by absorption. For example, it can be carried out by a process consisting of at least one activity from the group comprising drying, centrifugation and pressing of biomass with low melting temperature of ashes or of its mixture with milled materials. Prior to conveying it for combustion into the furnace of the combustion apparatus, it is advantageous to homogenize the mixture of biomass with low melting temperature of ashes and the milled materials. It holds that the lower is melting temperature of ashes of the biomass and milled materials, the more homogenous the mixture must be to prevent in case of imperfect homogenization short-term combustion of mixture with too low melting temperature of ashes, which would result in clagging the furnace or the fluidized bed.

In some case it is suitable to add another fossil fuel to the mixture of biomass with low melting temperature of ashes and milled materials to increase the caloric power of the combusted mixture to at least 7 MJ/kg or even better to 8 MJ/kg. To increase the caloric power of the combusted mixture, the added fossil fuel is usually conveyed to the furnace separately from the biomass with low melting temperature of ashes and milled materials and it is mixed with these components only in the boiler furnace.

Partial dewatering of stillage results in centrate, which is advantageously submitted to anaerobic breakdown, in the course of which biogas and sludge water are generated from the organic matter contained in it and the generated biogas is combusted. The combustion gases produced in the combustion of biogas obtained from centrate are further exploited to produce steam and/or hot water and/or warm water and/or to dry stillage from bioethanol processing or cake produced by its dewatering and/or to produce electric power Stillage from bioethanol processing or from the cake produced by its dewatering is dried by low-potential heat transfer medium such as air or gas or by hot heat transfer medium such as hot air and/or hot combustion gases and/or hot water and/or steam.

The problem of obtaining thermal energy from biomass with low melting temperature of ashes is also solved to a considerable extent by the apparatus for the production of thermal energy from stillage from bioethanol processing. This apparatus includes one distillation column or a number of distillation columns. At least one of the distillation columns is connected via its alcohol steams output with the input of the condenser/cooler fitted with bioethanol output and at least one distillation column is connected via its stillage output with the dewatering unit. The essence of the solution according to this invention is the fact that the dewatering unit is connected via its output of centrate with the biogas station and via its output of cake with the fuel supply to the boiler, while between the distillation column and the combustion chamber is provided a mixing equipment of the cake and/or the stillage and of the milled materials.

The specified problem of obtaining thermal energy from biomass with low melting temperature of ashes is also solved to a considerable extent by another apparatus for the production of thermal energy from stillage from bioethanol processing. This apparatus includes one distillation column or a number of distillation columns. At least one of the distillation columns is connected via its alcohol steams output with the input of the condenser/cooler fitted with a bioethanol output and at least one distillation column is connected via its stillage output with the dewatering unit. The essence of the solution according to this invention resides in the fact that the dewatering unit is connected via its output of centrate with the biogas station and via its cake output with the fuel supply to the boiler, while the feeder of biomass with low melting temperature of ashes and the feeder of milled materials join directly the boiler combustion chamber.

In both apparatuses the boiler may be advantageously connected by its steam outlet with the steam inlet of the distillation column, or the dewatering unit may well be connected with the stillage drier and this in turn may be connected via its cake outlet with the fuel supply to the boiler. The drier may be advantageously provided with at least one exchanger.

In yet another embodiment of the invention the biogas outlet of the biogas station is connected to the burner of an internal combustion turbine, whose outlet is connected with the outlet of electric power generator and whose waste gases outlet is connected to the drier and/or it is connected to the utilization boiler for producing steam and/or hot water and/or warm water, while the steam outlet of the utilization boiler is directed to the inlet of the steam turbine and/or drier. Alternatively, the biogas outlet of the biogas station is connected to the burner of the biogas combustion unit, as steam and/or hot-water and/or warm-water boiler and/or drier and/or internal combustion turbine and/or combustion chamber. The waste gases outlet of the biogas combustion unit may be advantageously connected to a drier. The drier may be advantageously provided with at least one heat exchanger.

In yet another embodiment of the invention the apparatus for obtaining thermal energy from stillage from bioethanol processing, the biogas outlet of the biogas station is connected to a gas engine with an electric power generator.

If the apparatus for producing thermal energy from stillage obtained from bioethanol processing is fitted with a heat exchanger, it is suitable to connect such a heat exchanger to the cooling circuit of the steam condenser of the steam turbine and/or to the cooling circuit of the centrate cooler and/or to the cooling circuit of the bioethanol condenser/cooler and/or to the cooling circuit of the gas engine. The drier may be a band drier, a fluidization drier or a drum drier or it may be a steam or a warm-water drier.

In yet another advantageous embodiment of the apparatus for obtaining thermal energy from stillage from bioethanol processing, which contains a cake mixing unit, a fuel granulator is advantageously connected with this mixing unit of the cake and milled materials In yet another advantageous embodiment of the apparatus for obtaining thermal energy from stillage from bioethanol processing, the biogas station is connected via its sludge water outlet with the inlet of biological waste water treatment plant, whose sludge outlet is connected with the drier inlet, and this usually via a centrifuge.

In yet another exemplary embodiment of the apparatus for obtaining thermal energy from stillage from bioethanol processing, the stillage dewatering unit includes a centrifuge and/or a press and/or a single- or multistage evaporator and a sedimentation tank.

In yet another exemplary embodiment of the apparatus for obtaining thermal energy from stillage from bioethanol processing is characterized by the fact that the steam outlet from the boiler is connected with the steam turbine inlet fitted with an electric power generator. The steam outlet may be connected with the steam inlet of the distillation column.

In yet another exemplary embodiment of the apparatus for obtaining thermal energy from stillage from bioethanol processing, the steam outlet is connected with the cake drier.

In the embodiment including the cake mixer, the mixer and stirrer of cake and milled materials is advantageously arranged between the dewatering unit and the drier.

In the embodiment comprising the mixer and stirrer of the cake and milled materials, the cake mixing unit may be arranged between the cake outlet of the stillage drier and the boiler combustion chamber or between the cake outlet of the drier and the fuel supply to the boiler.

The problem of obtaining thermal energy from biomass with low ash-melting temperature is also solved to a considerable extent by a fluidized bed boiler for the combustion of fuel formed by a mixture of biomass with low ash-melting temperature and milled materials, wherein the subject matter of the invention consists in the fact that this fluidized bed boiler is equipped with a fluidized bed furnace with a stationary oxidizing fluidized bed composed of a layer of inert material of a height of 1.5 m and the size of granules in the range from 0.3 to 2.5 mm, where the fluidized bed furnace is laterally delimited by an airtight cooled wall and in its lower section it is fitted with a fluidized bed grate provided with nozzles, to which the supply line of the combustion air is connected conveying combustion air under a pressure of 3000-25000 Pa, measured under standard temperature and pressure conditions to obtain a fluidation speed of 0.3 to 1.2 m/s. measured under standard temperature and pressure conditions, a high-pressure fan with adjustable flow rate of fluidizing combustion air being connected to the fluidized bed grate and at least one exhaust fan being connected to the boiler outlet to obtain controlled vacuum in the boiler, to the combustion chamber being directed at least one doser of fuel composed of a mixture of stillage and milled materials and/or at least two dosers, one of them being the doser of biomass with low ash-melting temperature of ashes and the other doser being doser of milled materials, while the mutual position and direction of outlet of the biomass with low ash-melting temperature and the milled materials is selected to achieve stirring of biomass with low ash-melting temperature and milled materials in the fluidized bed.

The problem of obtaining thermal energy from biomass with low ash-melting temperature is also solved to a considerable extent by a circulating fluidized bed boiler for the combustion of fuel composed of a mixture of biomass with low ash-melting temperature and the milled materials, wherein the subject matter of the invention consists in the fact that this boiler is equipped with a fluidized bed furnace chamber with a circulating fluidized bed composed of a layer of inert material and with the size of the granules in the range from 0.3 to 5 mm, where the fluidized bed furnace chamber is laterally delimited by an airtight cooled wall and in its lower section it is fitted with a fluidized bed grate provided with nozzles, to which the supply line of the combustion air is connected conveying combustion air under a pressure of 10 to 50 kPa, measured under standard temperature and pressure conditions to obtain a fluidation speed of 3 to 15 m/sec measured at standard temperature and pressure, a high-pressure fan or a blower with adjustable flow rate of fluidizing combustion air being connected to the fluidized bed grate and at least one exhaust fan being connected to the boiler outlet to obtain controlled vacuum in the boiler, to the combustion chamber being directed at least one doser of fuel composed of a mixture of stillage and milled materials and/or at least two dosers, one of them being the doser of biomass with low ash-melting temperature and the other one being a doser of milled materials, the mutual position and the direction of outlet of the biomass with low ash-melting temperature and the milled materials being selected to obtain stirring of biomass with low ash-melting temperature and milled materials in the fluidized bed.

The problem of obtaining thermal energy from biomass with low ash-melting temperature is also solved to a considerable extent by a grate boiler for the combustion of fuel composed of a mixture of biomass with low ash-melting temperature and milled materials, wherein the subject matter of the invention consists in the fact that this boiler is fitted with a water-cooled travelling and/or band-type grate and at least one doser of fuel composed of a mixture of biomass with low ash-melting temperature and milled materials.

The problem of obtaining thermal energy from biomass with low ash-melting temperature is also solved to a considerable extent by a dry bottom boiler for the combustion of fuel composed of a mixture of biomass with low ash-melting temperature and milled materials, wherein the subject matter of the invention consists in the fact that to the combustion chamber is directed at least one doser of fuel composed of a mixture of stillage and milled materials and/or at least two dosers, one of them being the doser of biomass with low ash-melting temperature and the other doser being a doser of milled materials while the mutual position and the direction of outlet of the biomass with low ash-melting temperature and the milled materials is selected to stir the biomass with low ash-melting temperature and the milled materials in the combustion chamber.

It is advantageous if at least one doser of fossil fuel more is directed to the combustion chamber of any of the above boilers, the doser cooperating with a doser of fuel composed of a mixture of low ash-melting temperature biomass and milled materials, to obtain a fuel mixture of a caloric power of at least 7 MJ/kg or even better of 8 MJ/kg.

BRIEF DESCRIPTION OF THE DRAWINGS

The invention will be described in more detail according to the enclosed drawings, where in FIG. 1 is shown a basic simplified flowchart of the apparatus according to the invention, in FIG. 2 is illustrated the heating system of the drier based on low-energy heat, in FIG. 3 is shown another flowchart of the exemplary embodiment of the apparatus according to the invention including a utilization boiler for processing waste heat from an internal gas turbine, in FIG. 4 is shown another flowchart of another exemplary embodiment of the apparatus according to the invention, wherein the biogas station is connected to a biological waste water treatment plant, in FIG. 5 is shown another flowchart of yet another exemplary embodiment of the apparatus according to the invention, wherein sludge from a biological waste water treatment plant is used, in FIG. 6 is shown another flowchart of yet another exemplary embodiment of the apparatus according to the invention, wherein the steam from a steam turbine is directed to the inlet of steam to the distillation column.

EXAMPLES OF INVENTION EMBODIMENTS

Figure 1:
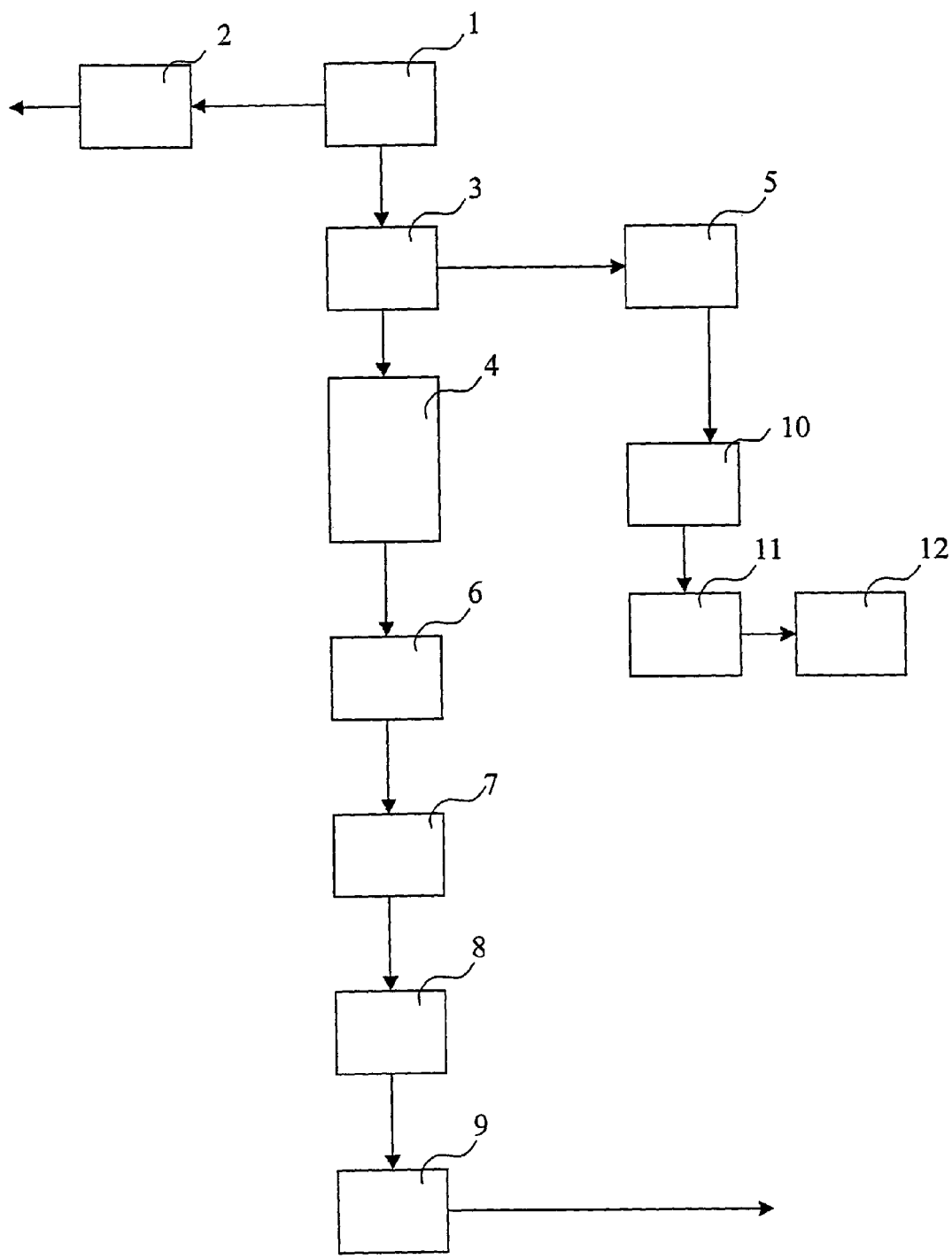

Tests have been carried out to see whether it is possible to burn stillage from bioethanol production in the existing boilers, in particular fluidized bed boilers.

In the first three experiments, no admixtures were added to the stillage.

Example No. 1

Dewatered maize stillage was burnt under laboratory conditions, without adding any admixtures. After the combustion, the ash weight was determined, which in this case amounted to 2.07% by weight of the combusted stillage. When analyzing the ashes, it was observed that the percentage of sodium and potassium, i.e. their total from the total weight of ashes, was 18.32%. The ash melting temperature was less than 630° C. It has been proved that this stillage is an absolutely inappropriate fuel, as the temperature of the combustion chamber is usually higher than the ash melting temperature of this sort of stillage, so that the melted ash would immediately slag the fluidized bed and/or the furnace and/or the heat exchange surfaces of the boiler.

Example No. 2

Dewatered corn stillage was burnt under laboratory conditions, without adding any admixtures. After combustion, the ash weight was determined, which in this case amounted to 3% by weight of the combusted stillage. When analyzing the ashes, it was observed that the percentage of sodium and potassium, i.e. their total from the total weight of ashes, was 30%. The ash melting temperature was less than 600° C. It has been proved that this stillage is an absolutely inappropriate fuel, as the temperature of the combustion chamber is usually higher than the ash melting temperature of this sort of stillage, so that the melted ash would immediately slag the fluidized bed and/or the furnace and/or the heat exchange surfaces of the boiler.

Example No. 3

Dewatered maize stillage was burnt under laboratory conditions, without adding any admixtures. After combustion, the ash weight was determined, which in this case amounted to 3.38% by weight of the combusted stillage. When analyzing the ashes, it was observed that the percentage of sodium and potassium, i.e. their total from the total weight of ashes, was 21%. The ash melting temperature was less than 630° C. It has been proved that this stillage is an absolutely inappropriate fuel, as the temperature of the combustion chamber is usually higher than the ash melting temperature of this sort of stillage, so that the melted ash would immediately slag the fluidized bed and/or the furnace and/or the heat exchange surfaces of the boiler.

After the stillage tests it was found out that the main cause of unusableness of the stillage as fuel are its poor properties, in particular an extremely low ash-melting temperature. The measurement showed that in current stillage the ash melting temperature is in a range of about 620° C. and often considerably lower. It is understandable that such a fuel cannot be burnt in boilers, as the melted ashes would immediately agglomerate the fluidized bed or slag the furnace or the heat exchange surfaces of the boiler. No positive result can be achieved without giving a solution to the problem of low ash melting temperature So it was supposed that first the problem of low ash melting temperature must be solved to be able to find out a method of obtaining thermal energy from the bioethanol production.

The experiments and measurement have shown that the ash melting temperature is the function of the presence of sodium and potassium in the fuel. The content of sodium and potassium in the fuel is not important, as it is usually low, generally about 0.2 to 2%. For the ash melting temperature is essential the content of sodium and potassium in the ashes, and in the stillage obtained from the bioethanol processing the concentration of sodium and potassium in the ashes amounts to tens of percents, which results in an extremely low ash melting temperature.

Each fuel, if designated as fuel, is usually characterized by the following basic data:
caloric power of fuel in MJ/kg
ash content in %
sulphur content in %
water content in %
combustion heat in MJ/kg
volatile combustible content in %.

Basic parameters may sometimes include determination of carbon, hydrogen, nitrogen, oxygen, in some cases also the determination of chlorine and fluor.

On the basis of the above basic parameters, it is usually possible to approximately determine the emissions the combustion gases could contain and to recommend the type of boiler to be used. Nevertheless, the above parameters are not sufficient at all to take a unique decision on whether the fuel is constantly combustible in a given apparatus. In a given potential fuel, it is also necessary to know the chemical composition of its ash material, primarily the content of silicon, aluminium, iron, magnesium, calcium and other elements including sodium and potassium. From the composition of the ash material, other fuel properties may be inferred. The essential property defining whether a fuel is or it is not constantly combustible in a given apparatus, is deemed to be the ash meltability. The ash meltability is characterized by four temperatures:
deformation temperature DT
softening temperature ST
fusion temperature HT
flow temperature FT The elements such as sodium and potassium reduce the ash melting temperature, the other elements, or their oxides as silicon, aluminium, iron, manganese, calcium increase the ash melting temperature. According to their contents, we can come to the conclusion, what will be the ash melting temperature like, whether low or high. The determination of the temperature on the basis of the chemical composition will be in this case difficult and the ash melting temperature can only be estimated. The simplest way of determining the ash melting temperature is to do it on a specific specimen, e.g. using an analyser according to the standard ČSN ISO 540. The ash is prepared e.g. according to the standard ČSN 441358.

In other tests, other milled materials were added to the stillage, which could be helpful in increasing the ash melting temperature. A usable fuel mixture could be prepared only after suitable milled materials were admixed to the stillage.

Example No. 4

Under laboratory conditions, dewatered maize stillage was combusted with an admixture of milled limestone. When analyzing the ashes, it was observed that the percentage of sodium and potassium, i.e. their total from the total weight of ashes, was 1 to 5.91, that is to say that 14.5% of the total weight of ashes is represented by sodium and potassium. The ash melting temperature was 805° C. Similar results were also achieved when calcium monoxide CaO was used instead of limestone. This fuel mixture could already be combusted, nevertheless, only when technological discipline was cautiously adhered to, as any accidental change of the ratio of stillage to limestone in the mixture could result in an increase of the furnace temperature above the melting temperature of ashes of the fuel mixture, whereupon the melted ashes would immediately agglomerate the fluidized bed or clag the furnace or the heat transfer surfaces of the boiler.

Example No. 5

Under laboratory conditions, dewatered maize stillage was combusted with an admixture of milled limestone. When analyzing the ashes, it was observed that the percentage of sodium and potassium, i.e. their total to the total weight of ashes, was 1 to 6.5, from which it follows that 13.3% of the total weight of ashes is represented by sodium and potassium. The ash melting temperature was 1,230° C. Similar results were also achieved when calcium monoxide CaO was used instead of limestone. This fuel mixture could be combusted, nevertheless, also in this case it was necessary to adhere cautiously to the technological discipline, as in a case of any accidental change of the ratio of stillage or limestone or CaO in the mixture it cannot be excluded that the furnace temperature could increase above the melting temperature of the ashes of the fuel mixture whereupon the melted ashes would immediately agglomerate the fluidized bed or clag the furnace or the heat transfer surfaces of the boiler.

Example No. 6

Under laboratory conditions, dewatered maize stillage was combusted with an admixture of milled limestone. When analyzing the ashes, it was observed that the ratio of sodium and potassium, i.e. their total, to the remaining weight of ashes, was 1 to 8.41, from which it follows that 10.6% of the total weight of ashes is represented by sodium and potassium. The ash melting temperature was 1,240° C. Similar results were also achieved when calcium monoxide CaO was used instead of limestone. This fuel mixture could already be combusted, nevertheless, also in this case it was necessary to adhere cautiously to the technological discipline, as in the case of any accidental change of the ratio of stillage or CaO in the mixture it cannot be excluded that the furnace temperature could increase above the melting temperature of the ashes of the fuel mixture whereupon the melted ashes would immediately agglomerate the fluidized bed or clag the furnace or the heat transfer surfaces of the boiler.

Example No. 7

Under laboratory conditions, dewatered maize stillage was combusted with an admixture of milled limestone. When analyzing the ashes, it was observed that the ratio of sodium and potassium, i.e. their total, to the remaining weight of ashes, was 1 to 15.17, from which it follows that 6.2% of the total weight of ashes is represented by sodium and potassium. The ash melting temperature was higher than 1,340° C. Similar results were also achieved when calcium monoxide CaO was used instead of limestone. This fuel mixture could already be combusted and it was already resistant to an accidental change of the ratio of stillage and limestone or CaO in the mixture. In the case of this fuel mixture, there is no danger of the furnace temperature increasing above the ash melting temperature of the fuel mixture, insomuch that there exists no threat of agglomerating the fluidized bed or clagging the furnace or the heat transfer surfaces of the boiler.

Example No. 8

Under laboratory conditions, dewatered maize stillage was combusted with an admixture of dust residues from stone processing. When analyzing the ashes, it was observed that the ratio of sodium and potassium, i.e. their total, to the remaining weight of ashes, was 1 to 15.01, from which it follows that 6.25% of the total weight of ashes is represented by sodium and potassium. The ash melting temperature was higher than 1,340° C. This fuel mixture could already be combusted, this mixture being already resistant to an accidental change of stillage to limestone ratio in the mixture. In this fuel mixture, there is no danger of the furnace temperature increasing above the ash melting temperature of the fuel mixture, insomuch that there exists no threat of agglomerating the fluidized bed or clagging the furnace or the heat transfer surfaces of the boiler.

Example No. 9

Under laboratory conditions, dewatered maize stillage was combusted with an admixture of mineral matter from the combustion of coal in a fluidised bed boiler. When analyzing the ashes, it was observed that the ratio of sodium and potassium, i.e. their total, to the remaining weight of ashes, was 1 to 20, from which it follows that 4.76% of the total weight of ashes is represented by sodium and potassium. The ash melting temperature was higher than 1,340° C. This fuel mixture could already be combusted, this mixture being already resistant to an accidental change of stillage to limestone ratio in the mixture. In this fuel mixture, there is no danger of the furnace temperature increasing above the ash melting temperature of the fuel mixture, insomuch that there exists no threat of agglomerating the fluidized bed or clagging the furnace or the heat transfer surfaces of the boiler.

Example No. 10

Under laboratory conditions, dewatered maize stillage was combusted with an admixture of duff coal containing 32% of ash in dry matter. When analyzing the ashes, it was observed that the ratio of sodium and potassium, i.e. their total, to the remaining weight of ashes, was 1 to 25, from which it follows that 3.85% of the total weight of ashes is represented by sodium and potassium. The ash melting temperature was higher than 1,340° C. This fuel mixture could be combusted, this mixture being already resistant to an accidental change of stillage to limestone ratio in the mixture. In this fuel mixture, there is no danger of the furnace temperature increasing above the ash melting temperature of the fuel mixture, insomuch that there exists no threat of agglomerating the fluidized bed or clagging the furnace or the heat transfer surfaces of the boiler.

Example No. 11

Under laboratory conditions, dewatered maize stillage was combusted with an admixture of milled limestone. When analyzing the ashes, it was observed that the ratio of sodium and potassium, i.e. their total, to the remaining weight of ashes, was 1 to 14, that is to say that 6.67% of the total weight of ashes is represented by sodium and potassium. The ash melting temperature was higher than 1,340° C. This fuel mixture could already be combusted, this mixture being already resistant to an accidental change of the stillage to limestone ratio in the mixture. In this fuel mixture, there is no danger of the furnace temperature increasing above the ash melting temperature of the fuel mixture, insomuch that there exists no threat of agglomerating the fluidized bed or clagging the furnace or the heat transfer surfaces of the boiler.

To ascertain the dependence of critical temperatures on the concentration of the added limestone, a series of measurements of these temperatures was carried out on test specimens of ashes from the fuel containing 0.5 to 3% of limestone from the weight of fuel dry matter The following temperatures were measured:

DT—the temperature at which the first symptoms of rounding of the point or the edges of the test specimen ST—temperature at which, in the case of a pyramid-shaped test specimen, the base height and width are the same (Softening temperature)

HT—temperature at which the test specimen forms a hemisphere, i.e. when the height is equal to ½ the diameter of the base (Hemispherical temperature)

FT—temperature at which the ash is spread on the base in a layer whose height is equal to ⅓ of the test specimen height at the melting temperature (Fluid temperature)

The meltability determination was carried out on an analyser in compliance with the standard ČSN ISO 540 by scanning the deformation changes of the test specimen in the form of a triangular pyramid via an electronic video system and by observing the operator in the course of the analysis. Thus the deformation temperature values were obtained.

The ash was prepared in compliance with the standard ČSN441358 and it was prepared at the temperature of 600° C.

The test specimens were figured as follows:

7104 limestone is added to the fuel in the amount of 0.5% by weight of the fuel dry matter 7105 limestone is added to the fuel in the amount of 1.0% by weight of the fuel dry matter 7106 limestone is added to the fuel in the amount of 1.5% by weight of the fuel dry matter 7107 limestone is added to the fuel in the amount of 2.0% by weight of the fuel dry matter 7108 limestone is added to the fuel in the amount of 3.0% by weight of the fuel dry matter

| Type of atmosphere | Oxidizing | | | | |
|---|---|---|---|---|---|
| Deforming temperatures Specimen designation | DT Deforming temperature ° C. | ST Softening temperature ° C. | HT Hemispherical temperature ° C. | FT Fluid temperature ° C. | sodium and potassium content % |
| 7104 | 660 | 750 | 800 | 930 | 15.08 |
| 7105 | 730 | 1140 | 1220 | 1350 | 12.73 |
| 7106 | 780 | 1200 | 1340 | 1400 | 10.94 |

-continued

| Type of atmosphere | Oxidizing | | | | |
|---|---|---|---|---|---|
| Deforming temperatures Specimen designation | DT Deforming temperature °C. | ST Softening temperature °C. | HT Hemispherical temperature °C. | FT Fluid temperature °C. | sodium and potassium content % |
| 7107 | 860 | 1290 | 1380 | 1410 | 10.50 |
| 7108 | 1280 | 1300 | 1340 | 1410 | 8.18 |

The same measurements were performed on stillage specimens, to which ash matter was added, i.e. products of coal burning and the following results were obtained:
Ash test specimens:
7109 inherent ash is added to the fuel in the amount of 0.5% by weight of the fuel dry matter
7110 inherent ash is added to the fuel in the amount of 1.0% by weight of the fuel dry matter
7111 inherent ash is added to the fuel in the amount of 1.5% by weight of the fuel dry matter
7112 inherent ash is added to the fuel in the amount of 2.0% by weight of the fuel dry matter
7113 inherent ash is added to the fuel in the amount of 3.0% by weight of the fuel dry matter

| Type of atmosphere | Oxidizing | | | | |
|---|---|---|---|---|---|
| Deforming temperatures Specimen designation | DT Deforming temperature °C. | ST Softening temperature °C. | HT Hemispherical temperature °C. | FT Fluid temperature °C. | sodium and potassium content °C. |
| 7109 | 700 | 760 | 940 | 1130 | 15.1 |
| 7110 | 790 | 860 | 1150 | 1310 | 13.1 |
| 7111 | 1020 | 1160 | 1240 | 1340 | 11.7 |
| 7112 | 1130 | 1180 | 1260 | 1380 | 11.4 |
| 7113 | 1210 | 1250 | 1310 | 1390 | 9.86 |

In the stillage test specimen, with inherent ash, slightly higher melting temperatures were observed already when a small amount of inherent ash was added, when more than 3% or even better when 5% of inherent ash was added, the ash melting temperatures are relatively high, which makes it possible to operate the boiler with a relative safety and the imminent threat of fluidised layer agglomeration or of clagging the furnace or the boiler heat transfer surfaces is eliminated.

Thus in the tests with processing fuel from stillage provided from the bioethanol production it was found out that it is possible to obtain thermal energy from stillage from the bioethanol production, provided that the stillage from the bioethanol production is partially dewatered and mixed with milled materials in a ratio providing the ashes melting temperature of the resulting mixture higher than the critical temperature causing the clagging of the furnace and/or the heat transfer surfaces and/or the fluidised bed with melted ashes, whereupon the mixture is combusted in the combustion apparatus. It proved that it is not only possible to dewater the bioethanol stillage first and only then to mix it with the milled materials, but that it is also possible to mix the bioethanol stillage with the milled materials first and only then to dewater the obtained mixture. Nevertheless, the first method seems to be more advantageous.

To obtain in this method of obtaining the thermal energy from bioethanol stillage the best efficiency possible, that is to say, to ensure that the combustion of bioethanol stillage is worth doing, it is necessary to perform the dewatering process in such a manner that minimum energy or the least possible amount of thermal energy is invested. It is advantageous to apply two-stage dewatering, the first stage being mechanical dewatering, in which the liquid stillage is centrifuged, preferably in a highly efficient decanter centrifuge, in which dewatering to a level of 30-36% of dry matter can be achieved. Yet another possible type of mechanical dewatering is the stillage pressing. A higher degree of dewatering is usually achieved by drying, preferably in a drum drier. The dry matter can be completely dewatered, i.e. up to 100% of dry matter; nevertheless, drying in the drier is usually performed to a level of 86-88% of dry matter. The drying medium may be combustion gases from the natural gas or biogas burner, or another medium. Hot air heated up by steam or combustion gases may also be used for drying. To dry stillage, we may also use an evaporator, where steam is usually used as a drying medium.

The degree of the stillage thermal self-supporting capacity depends on the degree of dewatering. In the case of a high degree of dewatering, the stillage caloric power can achieve up to approximately 19 MJ/kg.

To granulate stillage, the recommended dry matter content is in the range of 86-88%. Granulation is usually performed on rotary granulators.

An essential component part of the treatment of stillage obtained from the bioethanol production is to admix a suitable material to the stillage so that the resulting mixture would be homogenous and the ratio of stillage to the milled mater constant. The granulometric composition of the milled materials should be comparable to the granulometric composition of the original stillage, which advantageously represents the size of the particles of the milled material from 0 up to 2 mm, the particles being in the whole spectrum of this range. If limestone is used, it is designated in the terminology of cement specialists as "grits". The term grits in the cement specialists' meaning of the world is meant to define a definite material and its granulometric composition. In other kinds of biomass as corn meal, corn flour, maize, maize flour or maize meal, materials with a higher ash melting temperature can be admixed and it is possible to proceed in the same way as in the case of stillage. In the case of corn straw, cereals and for example residues from the production of sunflower-seed oil or rape-seed oil, the biomass particles are substantially bigger than the particles of the milled material, whose size is in the range from 0 up to 2 mm and therefore it is better to mill these materials in such a manner that their granulometric composition be comparable to the granulometric composition of the milled materials and then to mix them or to mix and only then to mill them in such a manner that the resulting mixture be homogenous. If the granulometric composition of biomass and admixed milled materials is markedly different, it would be necessary to multiply the amount of admixed milled materials to obtain an analogous result.

The fuel mixture in which the ratio of stillage and milled materials is set up to obtain the resulting HT melting temperature of the mixture ashes of about 760° C., or in which the ratio of stillage to milled materials is set up to obtain the total of weight of sodium and potassium in the ashes to the weight of the other incombustible components in the ashes to a value slightly lower than 1:5.85 may combusted in boilers, nevertheless, it is difficult to keep the boiler combusting such a fuel mixture in operation, as when combusting such a fuel, the boiler is at the limit of its operability and there is danger that it cannot be maintained at operable parameters to prevent its breakdown. It is also difficult to produce really homogenous fuel in such a manner that each batch of fuel added into the boiler had the same ratio, of stillage to admixed milled materials. Due to the nonuniformity of mixed materials, the ash matter may agglomerate in the furnace or on the heat transfer surfaces or it may cause clagging of the fluidised bed.

Nevertheless, such a boiler can be operated even at low temperatures, i.e. at a temperature not too far from the melting temperature, which is evidenced by the boiler run-up proper. For example a fluidised bed boiler can be operated and used for combustion even if the temperature of the fluidised bed will be only 500 or 600° C. In a grate-type boiler or a dry bottom boiler it is similar, nevertheless, the operation is not optimal, even if possible.

Better results are obtained in a fuel mixture in, which the ratio of stillage and milled materials is set up to obtain the resulting HT melting temperature of the mixture ashes of about 1.200° C., or in which the ratio of stillage to milled materials is set up to obtain the ratio of total of weight of sodium and potassium in the ashes to the weight of the other incombustible components in the ashes of a value slightly less than 1:6,50. In such a case the boiler operation will be less exacting as regards the observance of the technological discipline. In view of the fact that also in this case fuel is located in a sensitive region where each change of the milled material concentration may cause technological problems; it is recommendable to deal with the fuel production by devising such a fuel mixture in which the ratio of stillage to milled materials is set up to obtain the resulting melting temperature (HT) of the mixture ashes of above 1,300° C., or in which the ratio of stillage to milled materials is set up to obtain the ratio of the total of sodium weight and potassium weight in the ashes to the weight of other uncombustible components in the ashes of a value less than 1:15. This solution gives better results both in the boiler operation and the fuel production.

The best results were achieved in fuels in which the added milled materials contain calcium, such as limestone, burned lime or lime hydrate. That is to say, stillage contains a considerable amount of sulphur, namely approx. 0,6% and even chlorine, namely 0.12 to 0.4%, which would induce high-temperature corrosion of the boiler. And these materials containing calcium are able to desulphurize combustion gases and also to reduce the contents of chlorine in the combustion gases. The effect of these materials, especially in fluidised bed boilers, markedly reduces the risk of formation of dioxins and furans and the risk of inducing high-temperature chlorine corrosion. The materials rich in calcium, in addition to it, reduce the content of other halogen elements in the combustion gases in fluidised bed boilers.

In grate boilers, calcium has only a limited influence on the emissions.

As suitable milled materials, it is advantageous to use fuel produced from sludge from water treatment plants according to the Czech utility design No. 16624 "Fuel for boilers, especially for fluidised bed boilers".

As suitable milled materials, it is also possible to use petroleum cokes, which are the solid residues from the oil refining. As further milled materials, it is possible to use wood chips, rape straw, hay, sorrel, hop-tree etc., nevertheless, there is a drawback consisting in the fact that these materials contain only a small amount of ash and they have to be added in rather great amounts in comparison to calcium. The corn straw is unsuitable, as the ash melting temperature of corn straw is usually about 800° C. and if we add it, its effect would be rather negative.

The most suitable boilers for the combustion of fuel mixture obtained according to the above described method seem to be the fluidised bed boilers, especially the boilers with a stationary fluidised bed. These boilers are especially suitable when combusting fuel mixed with milled materials rich in calcium, as in addition to the fact that these fuels can be burnt in these boilers, there exists an added effect of the calcium, which reduces the content of sulphur, chlorine and other halogen elements in combustion gases. The reduction of chlorine content in the combustion gases has an essential effect on the suppression of high-temperature corrosion, which may in other boilers with other than fluidised bed combustion cause considerable operating troubles, i.e. the chlorine corrosion, which markedly reduces the service life of the boiler unit. The boilers with stationary fluidised bed are suitable for outputs of 1-50 MW. The boilers with circulating fluidised bed have similar effects to those of stationary fluidised bed boilers, but they are used for outputs of 50 MW and higher. It appears that the most suitable grate boilers are the grate boilers with water-cooled grates. Dry bottom boilers may also be used for the combustion of the above specified fuel mixtures.

The results obtained in the combustion of stillage may be generalized for the combustion of any kind of biomass with low ash-melting temperature. In other kinds of biomass as corn meal, corn flour, maize, maize flour or maize meal, materials with a higher ash melting temperature can be admixed and it is possible to proceed in the same way as in the case of stillage. In the case of corn straw, cereals and for example residues from the production of sunflower-seed oil or rape-seed oil, the biomass particles are substantially bigger than the particles of the milled material, whose size is in the range from 0 up to 2 mm and it is therefore better to triturate these materials in such a manner that their granulometric composition be comparable to the granulometric composition of the milled materials and only then to mix them or to mix and mill them in such a manner that the resulting mixture be homogenous. If the granulometric composition of biomass and admixed milled materials is markedly different, it would be necessary to multiply the amount of admixed milled materials to obtain an analogous result.

Generally it holds that if by adding the above mentioned milled materials to the fuel mixture we can be achieve the ratio of the total of sodium and potassium in the ashes to the weight of the other incombustible components of a value less than 1:5.85, the resulting fuel is well combustible, without clagging the furnace or the fluidised bed with melted ash.

Nevertheless, the above described fuel production is not wasteless either. When dewatering stillage, centrate is produced, which is also processable and we may obtain energy from it. It is therefore suitable to complement the manufacturing plant for the production of bioethanol by other processing and producing units, which would be able to process stillage in a comprehensive way. Hereinafter we shall describe the method of further stillage processing and the equipment for the implementation thereof.

After partial dewatering, the centrate obtained from stillage is after cooling subjected to anaerobic decomposition, in which biogas and sludge water are produced from the organic matter contained in it, whereupon the produced biogas is burned, while the cake produced by stillage dewatering is dried before burning it.

After separating the centrate, the solid component of the waste from the production of bioethanol is mixed with milled materials, namely after its partial dewatering or even before it is dewatered. More preferably, the driest possible cake is mixed with the milled materials, because the milled materials do not usually need any dewatering and thus smaller volumes may be dewatered. Stillage is dewatered by centrifugation or pressing or it may be dried.

Stillage is dewatered by drying it using a heat transfer medium, the heat transfer medium being hot air and/or hot combustion gases and/or hot water and/or steam. Nevertheless, it is economically much more preferable to dewater stillage using exhaust heat, which is otherwise difficult to utilise, it has an optimal temperature for drying stillage, being a low-potential heat transfer medium as air or gas, to achieve a dry matter content of at least 45% or even better a dry matter content of at least 86%.

The combustion gases produced by combusting biogas obtained from centrate may be further used for the production of steam and/or hot water and/or warm water.

The apparatus for implementing the above described method of complex stillage processing is described in more detail hereinafter with reference to the enclosed drawings.

FIG. 1 illustrates a simplified flowchart of an apparatus for obtaining thermal energy according to the present invention in which the main features of the invention can be demonstrated. At least one distillation column 1 of the block of distillation columns 1 is connected via its alcohol vapours outlet with condenser/cooler 2, which is provided with a bioethanol outlet. At least one distillation column 1 of the block of distillation columns 1 is at the same time connected via its stillage outlet with dewatering unit 3, which is connected via its cake outlet with drier 4 and via its centrate outlet with centrate cooler 5. Drier 4 is connected via its dry cake outlet with the inlet of mixing unit 6 of cake and milled materials. Mixing unit 6 of cake and milled materials is connected via its fuel inlet to the fuel inlet to boiler 7, which is connected via its steam outlet to steam turbine 8 connected with electric power generator 9. Cooler 5 of centrate is connected via its centrate outlet to biogas station 10, in which the anaerobic decomposition of centrate takes place and biogas is generated. The biogas outlet of biogas station 10 is connected in this embodiment to gas turbine 11 connected with electric power generator 12.

In distillation chambers 1 distillation of biological material used for bioethanol production takes place, for example distillation of beet chippings, corn, cereals etc. The distillation waste is first partially dewatered, for example it is centrifuged, and thus the liquid fraction and the solid fraction of the waste are separated from each other. The liquid fraction, i.e. the centrate, is cooled in centrate cooler 5 and it is directed to biogas station 10, where biogas and sludge water are generated due to the centrate anaerobic decomposition. Biogas is combusted in gas turbine 11 and its energy is transformed into electric power in electric power generator 12. The solid fraction, i.e. stillage, is first dried in drier 4, whereupon it is mixed with milled materials to increase the melting temperature of the produced fuel above the critical limit and the fuel is then combusted in boiler 7, preferably in a fluidised bed boiler. The steam produced in the operation of boiler 7 is directed to steam turbine 8 connected with electric power generator 9 and here the thermal energy is converted to mechanical energy and from mechanical energy to electric power.

Figure 2:
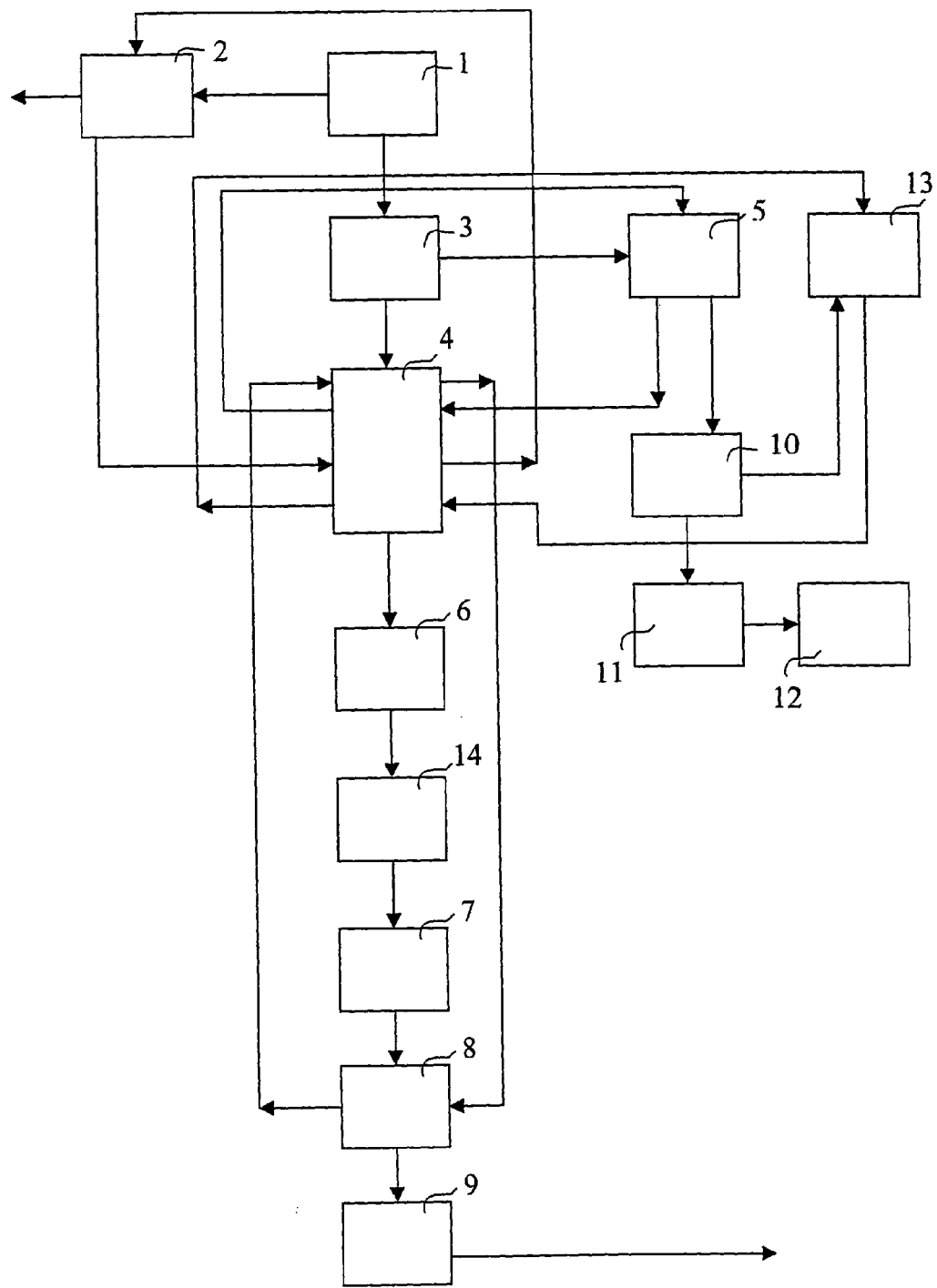

FIG. 2 illustrates the system of heating drier 4 by low-energy heat, drawn in a simplified flowchart of the apparatus for the implementation of the invention from FIG. 1 with added gas engine 13 and fuel granulator 14. Drier 4 is fitted with several exchangers to which cooling circuits of the condensing section of steam turbine 8, centrate coolers 5, condenser/cooler 2 of bioethanol and gas engine 13 are connected. Drier 4 is either of band type, fluidised type or drum type. The exchangers in drier 4 are usually arranged according to their temperature in series in the direction of procedure of the stillage cake, the coolest cooling circuit being usually connected to the exchanger that the stillage cake enters first. The cake is thus gradually dried and the dried cake is directed to mixing unit 6 of the cake and milled materials. There may be more or less exchangers, as well as used cooling circuits. Although in this exemplary, embodiment biogas station 10 is connected by its biogas outlet both to combustion turbine 10 and gas engine 13, more frequently there is in the whole apparatus either only gas turbine 11 or only gas engine 13. Mixing unit 6 of cake and milled materials is connected to fuel granulator 14, from which the granulated fuel is conveyed to fuel supply of boiler 7.

Figure 3:
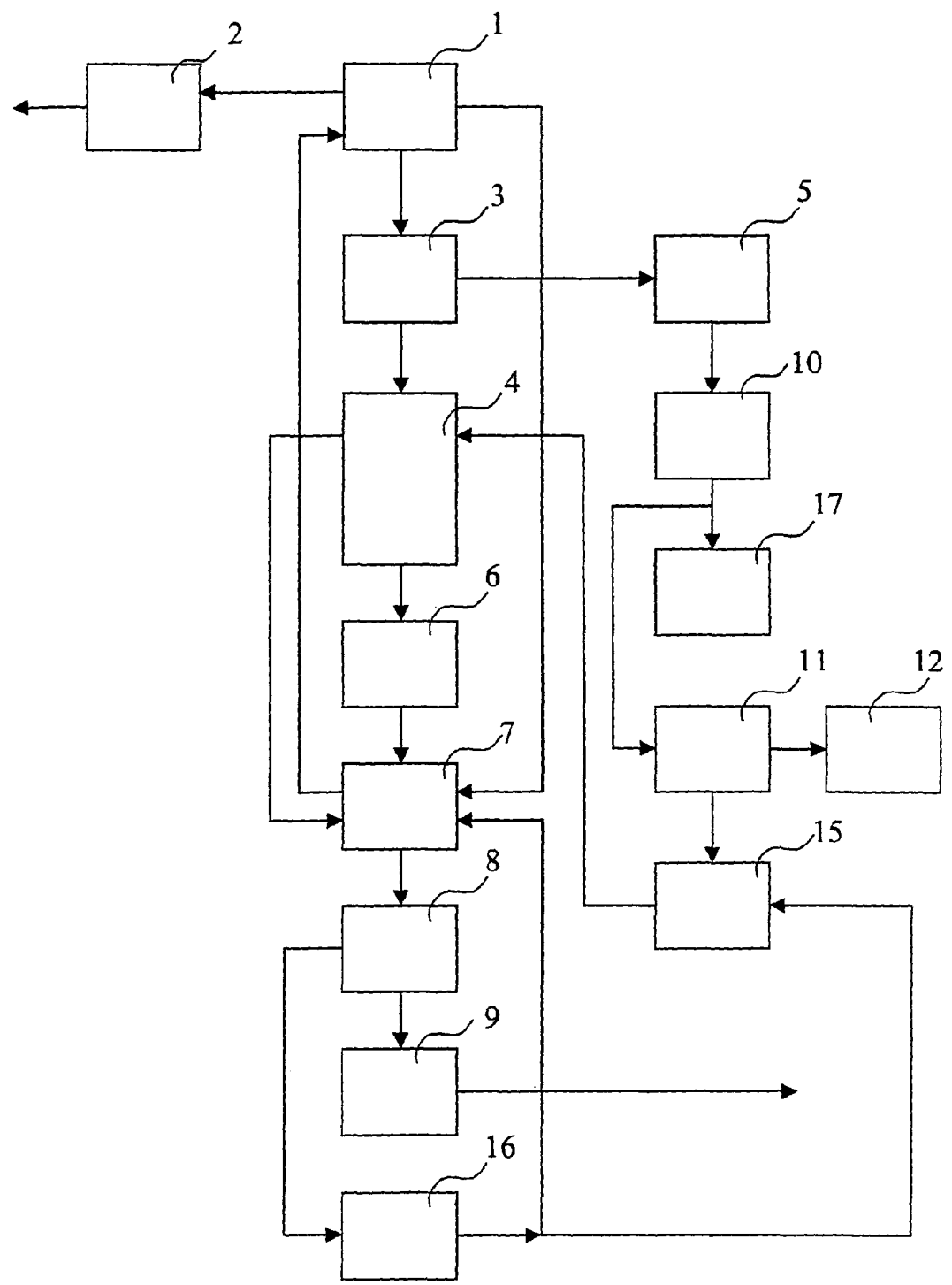

FIG. 3 illustrates yet another flowchart of an exemplary embodiment of the apparatus according to the present invention comprising a utilization boiler 15 for processing waste heat from combustion turbine 11. At least one distillation column 1 of the block of distillation columns 1 is connected by its outlet of alcohol steams with the condenser/cooler 2 fitted with a bioethanol outlet, At least one distillation column 1 of the block of distillation columns 1 is at the same time connected via its stillage outlet with dewatering unit 3, which is connected via its cake outlet with drier 4 and via its centrate outlet with centrate cooler 5. Drier 4 is connected via its dry cake outlet with the inlet of mixing unit 6 of cake and milled substances. Mixing unit 6 of cake and milled substances is connected via its fuel inlet to the fuel inlet to boiler 7, which is connected via its steam outlet to steam turbine 8 connected with electric power generator 9 and with the steam inlet of steam condenser 16. The condensate outlet of distillation column 1 is connected to the condensate inlet of boiler 7, while the steam outlet from boiler 7 is connected to the steam inlet of distillation column 1. Cooler 5 of centrate is connected by its centrate outlet to biogas station 10, in which the anaerobic decomposition of centrate takes place and biogas is produced. The biogas outlet from biogas station 10 is connected in this embodiment to steam boiler 17, whose outlet is connected with combustion turbine 11, which is connected with electric power generator 12. Instead of steam boiler 17, a hot water boiler or a warm water boiler may also be used. The outlet of combustion gases from combustion turbine 11 is connected to utilization boiler 15, whose steam outlet is in this exemplary embodiment connected to the exchanger of drier 4 and whose condensate inlet is connected to the outlet of condensate from steam condenser 16. To another exchanger of drier 4 may also be connected the outlet of combustion gases of boiler 15.

In this exemplary embodiment, the combustion gases from combustion turbine 11, which otherwise would represent the waste heat of the system, are utilized for heating utilization boiler 15, which heats up at least one exchanger of drier 4. Thus a low-energy component is used to improve the economics of the stillage combustion apparatus.

Figure 4:
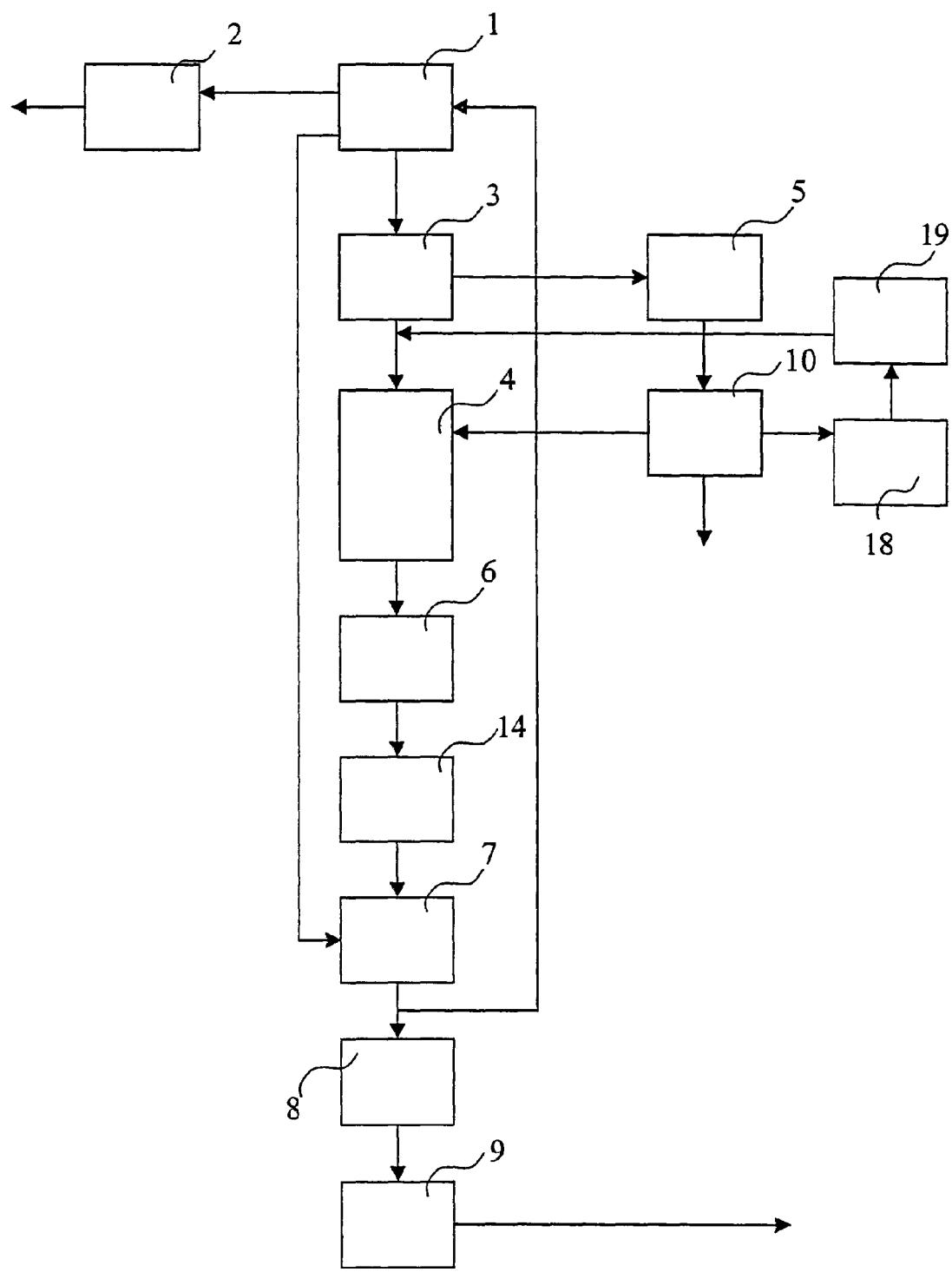

FIG. 4 illustrates yet another flowchart of another exemplary embodiment of the apparatus according to the present invention, in which biogas station 10 is connected via its sludge outlet to biological water treatment plant 18, whose sludge outlet is connected via centrifuge 19 with the inlet of cake of drier 4. At least one distillation column 1 of the block of distillation columns 1 is connected via its steam vapours outlet with condenser/cooler 2, which is fitted with a bioethanol outlet. At least one distillation column 1 of the block of distillation columns 1 is at the same time connected via its stillage outlet with dewatering unit 3, which is connected via its cake outlet with drier 4 and via its centrate outlet with centrate cooler 5. Drier 4 is connected via its dry cake outlet with the inlet of mixing unit 6 of cake and milled substances. Mixing unit 6 of cake and milled materials is connected via its fuel outlet via fuel granulator 14 to the fuel inlet of boiler 7, which is connected via its steam outlet to steam turbine 8 connected with electric power generator 9. The condensate outlet of distillation column 1 is connected to the condensate inlet of boiler 7, while the outlet of steam from boiler 7 is connected to the steam inlet of distillation column 1. Cooler 5 of centrate is connected by its centrate outlet to biogas station 10, in which the anaerobic decomposition of centrate takes place and biogas is produced. The biogas outlet from biogas station 10 is in this embodiment connected to the burner of drier 4.

In this exemplary embodiment, the sludge water remaining from the anaerobic decomposition of centrate is conveyed to biological waste water treatment plant 18 and there water and sludge are separated. Treated water may be directed to a public sewer system or it may be, if need be, used after tertiary treatment including membrane separation for technological purposes in an alcohol plant, for example as steeping water, for rinsing, preparation of chemicals or as cooling water. Sludge from biological waste water treatment plant 18 is dewatered, usually using a centrifuge 19 such as a standard decanter centrifuge. Dewatered sludge will be added to dewatered stillage, which will be dried together in drier 4, usually a drum drier.

Figure 5:
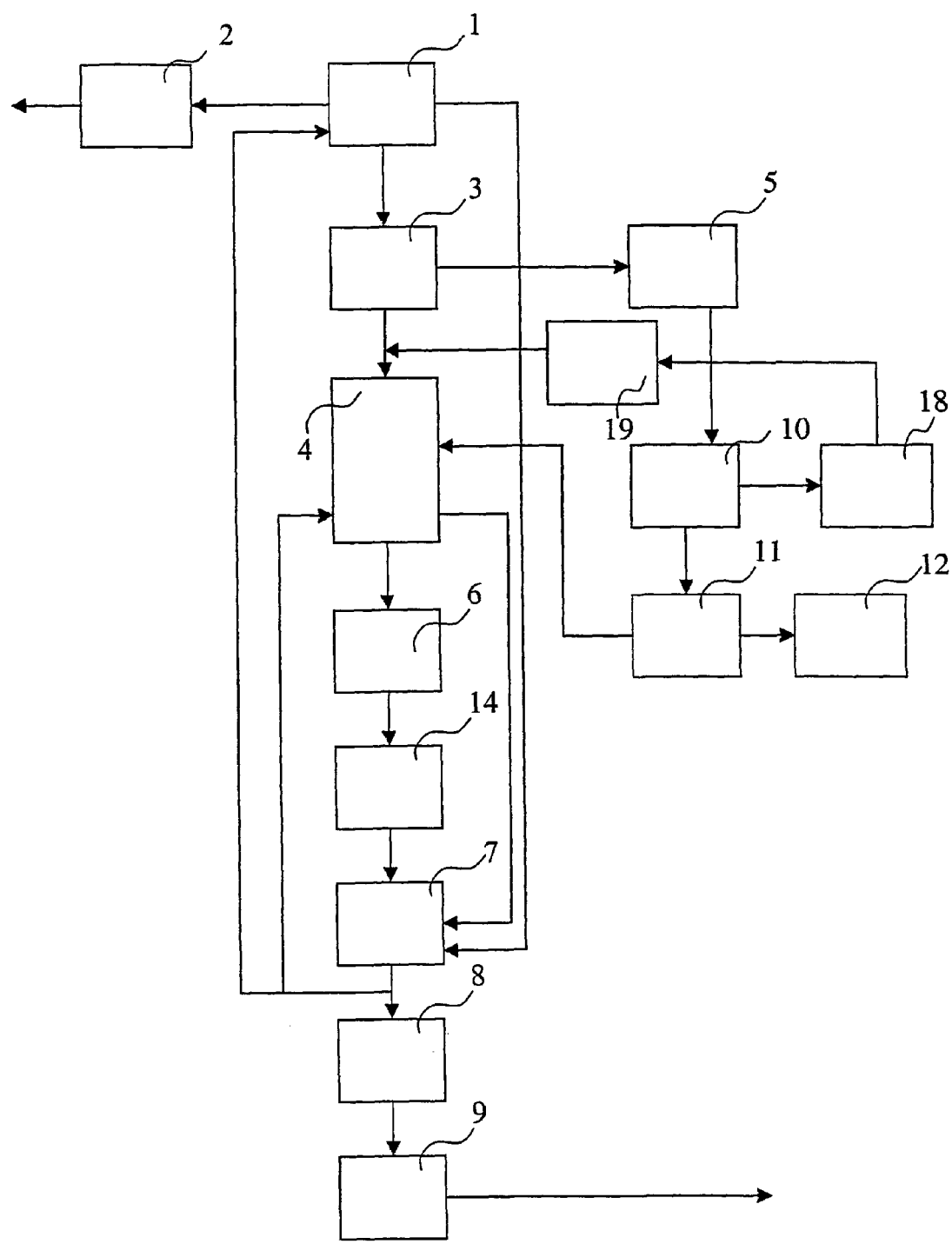

FIG. 5 illustrates another flowchart of yet another exemplary embodiment of the apparatus according to the invention, wherein sludge from a biological waste water treatment plant 18 is used. This exemplary embodiment differs from the embodiment of FIG. 4 by the biogas outlet from biogas station 10, which is not connected to the burner of drier 4, but to the biogas inlet of combustion turbine 11, whose combustion gases outlet is connected to at least one exchanger of drier 4. The outlet of steam of boiler 7 is then connected not only to the steam inlet of distillation column 1, but also to another exchanger of drier 4, while the outlets of condensate of the respective exchanger of drier 4 and distillation column 1 are connected to the inlets of condensate of boiler 7.

Figure 6:
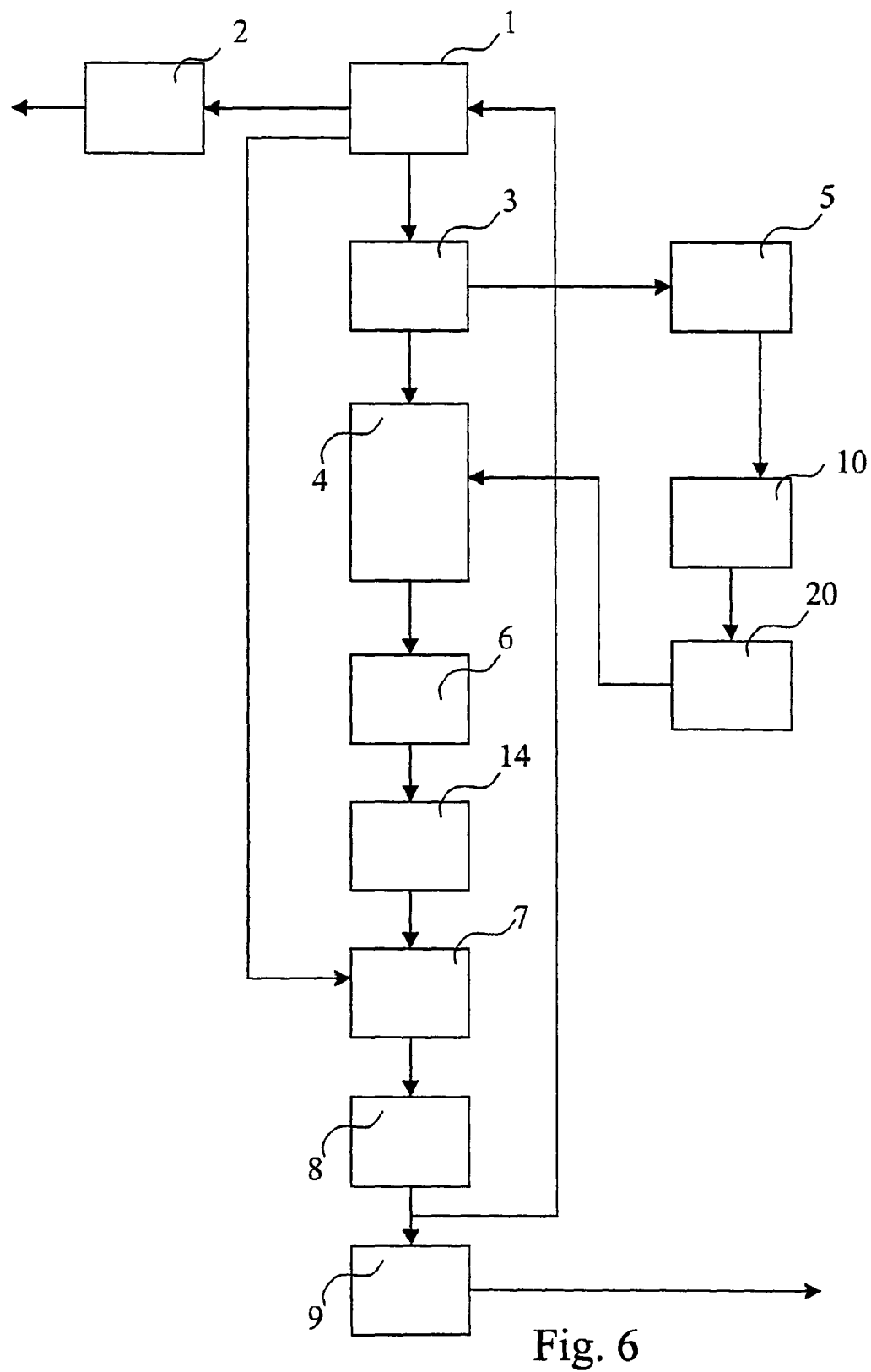

FIG. 6 illustrates another flowchart of another exemplary embodiment of the apparatus according to the present invention, in which the steam from steam turbine 8 is conveyed to the inlet of steam of distillation column 1. This exemplary embodiment differs from the preceding exemplary embodiment by the fact that biogas outlet of biogas station 10 is not connected to the biogas inlet of combustion turbine 11, but to the biogas inlet of combustion chamber 20, whose combustion gases outlet is connected to at least one exchanger of drier 4.

The main advantage of all the above indicated exemplary embodiments of the present invention and also of all the other possible combinations enabling formulation of patent claims is, in addition to the essential solution given to the combustion of stillage, also the energy self sufficiency of the whole system. Solution is thus given to the complex processing of stillage for energy purposes via a highly ecological technology, which produces no waste requiring deposition, it observes emission limits relative to the composition of combustion gases and treated water may be drained into a public sewage system or may be reused for technological purposes. If limestone or lime is used as milled material, the inherent ash will be a welcome feedstock for cement-works, in some cases the inherent ash may also be used as a suitable fertilizer. Important technological component parts may be doubled and backed up, which may guarantee continuous and year-long operation of an alcohol biodistillery. The stillage from bioethanol production is thus processed in a no waste form while producing useful energy. The redundant electric power may be sold for an advantageous tariff valid for the production of power from biomass.

INDUSTRIAL UTILITY

The method of obtaining thermal energy from stillage from the bioethanol production as well as apparatuses for the implementation thereof may be used in alcohol distilleries, where it solves the problem of process waste in such a manner that instead of financial burden is will become a financial benefit. The specified procedures and apparatuses also solve the problems of environmental impact by the process waste.

The invention claimed is:

1. A method for obtaining thermal energy from a first biomass having a critical combustion temperature and having ash with a melting temperature lower than the critical combustion temperature comprising combusting a combined mixture comprising the first biomass together with a milled substance selected from the group consisting of limestone, lime hydrate, lime, stone, sand, combustion ashes, products of desulphurization, dust residues from the production and treatment of ore, aggregates, fossil solid fuels as coal, lignite, or peat, solid fuels produced from sludge waste water treatment plants, artificial fuels produced from the group of petrol cokes, natural products having a melting temperature of ashes greater than the critical combustion temperature of said first biomass, and mixtures thereof, wherein a ratio of the first biomass to the milled substance is established to provide a melting temperature of ashes of the combined mixture greater than a critical combustion temperature of said mixture.

2. The method claimed in claim 1, further comprising mixing the first biomass with the milled substance before the first biomass is conveyed to a combustion apparatus.

3. The method claimed in claim 1, wherein the combined mixture has a dry matter content of at least 20% by weight.

4. The method claimed in claim 3, wherein the combined mixture has a dry matter content of at least 86% by weight.

5. The method claimed in claim 1, further comprising setting up a ratio of the first biomass to the milled substance to achieve a ratio by weight of sodium and potassium in the ashes of the combined mixture to other non-combustible components in the ashes of the combined mixture of less than 1:5.85 and to thereby achieve the resulting ash melting temperature of the combined mixture higher than 760° C.

6. The method claimed in claim 5, further comprising setting up the ratio of the first biomass to the milled substance to achieve said ratio of sodium and potassium in the ashes of the combined mixture to the weight of the other non-combustible components in the ashes of the combined mixture of less than 1:6.50 and to thereby achieve the resulting ash melting temperature of the combined mixture higher than 1,200° C.

7. The method claimed in claim 6, further comprising setting up the ratio of the first biomass to the milled substance to achieve said ratio of sodium and potassium in the ashes of the combined mixture to the weight of the other non-combustible components in the ashes of the combined mixture of less than 1:15 and to thereby achieve the resulting melting temperature of the ash of the combined mixture higher than 1,300° C.

8. The method claimed in claim 3, further comprising dewatering the first biomass-mixture mechanically, thermally, by absorption, or a combination thereof.

9. The method claimed in claim 8, further comprising dewatering the combined mixture by a process comprising at least one activity from the group consisting of drying, centrifugation and pressing.

10. The method claimed in claim 1, further comprising homogenizing the combined mixture before conveying it to a combustion apparatus.

11. The method claimed in claim 1, further comprising adding a fossil fuel to the combined mixture in an amount effective to increase a caloric content of the combined mixture to at least 7 MJ/kg.

12. The method claimed in claim 11, wherein the amount of fossil fuel added to the combined mixture is effective to increase the caloric content of the combined mixture to at least 8 MJ/kg.

13. The method claimed in claim 11, further comprising conveying the fossil fuel to be added to a combustion apparatus separately from the combined mixture.

14. The method claimed in claim 3, wherein the first biomass is partially dewatered stillage obtained from a centrate.

15. The method claimed in claim 14, further comprising obtaining biogas from said centrate wherein said biogas obtained from the centrate is further combusted.

16. The method claimed in claim 14, wherein the stillage is dewatered via low-potential heat transfer medium or via hot heat transfer medium.

* * * * *